(12) United States Patent
Miller et al.

(10) Patent No.: US 6,327,230 B1
(45) Date of Patent: Dec. 4, 2001

(54) DISK PROCESS AND TRANSPORT MECHANISM FOR HOST MACHINES

(75) Inventors: David B. Miller, Orinda; Alexander V. Drynkin, Walnut Creek; William M. Hess, San Francisco, all of CA (US)

(73) Assignee: Copypro, Inc., Concord, CA (US)

( * ) Notice: Subject to any disclaimer, the term of this patent is extended or adjusted under 35 U.S.C. 154(b) by 0 days.

(21) Appl. No.: 09/434,206

(22) Filed: Nov. 4, 1999

(51) Int. Cl.$^7$ .................................................. G11B 17/22
(52) U.S. Cl. .......................................... 369/34; 364/479.05
(58) Field of Search .................... 360/92; 369/36, 369/34, 30; 364/478.02, 478.04, 478.06, 478.15, 479.01, 479.02, 479.03, 479.04, 479.05

(56) References Cited

U.S. PATENT DOCUMENTS

| | | | |
|---|---|---|---|
| 4,910,675 | * 3/1990 | Burns et al. | 364/478.11 |
| 5,734,629 | * 3/1998 | Lee et al. | 369/34 |
| 5,949,688 | * 9/1999 | Montoya et al. | 700/235 |

FOREIGN PATENT DOCUMENTS

| | | | |
|---|---|---|---|
| 297 15 942 U1 | * 12/1997 | (DE) . | |
| 0 309 298 A3 | * 3/1989 | (EP) . | |
| 0 649 121 A2 | * 4/1995 | (EP) . | |
| 60-66382 | * 4/1985 | (JP) . | |
| 10-307963 | * 11/1998 | (JP) . | |
| 11-232835 | * 8/1999 | (JP) . | |
| 96/42074 | * 12/1996 | (WO) . | |
| 97/24218 | * 7/1997 | (WO) . | |

* cited by examiner

*Primary Examiner*—William Klimowicz
(74) *Attorney, Agent, or Firm*—Richard Esty Peterson Patent Attorney

(57) ABSTRACT

A disk copying and dispensing apparatus including a disk processing module installable in a host device such as a disk vending machine, the module having a frame containing a displaceable carriage mechanism with a disk pick-up head, at least one disk recorder with an extendible tray for receiving or discharging a disk, a disk label printer and at least one disk parking tray with one embodiment having an actuatable disk dispensing chute, the disk carriage being movable from one device to another under control of a controller, in accordance with a programmed sequence of a processor.

23 Claims, 3 Drawing Sheets

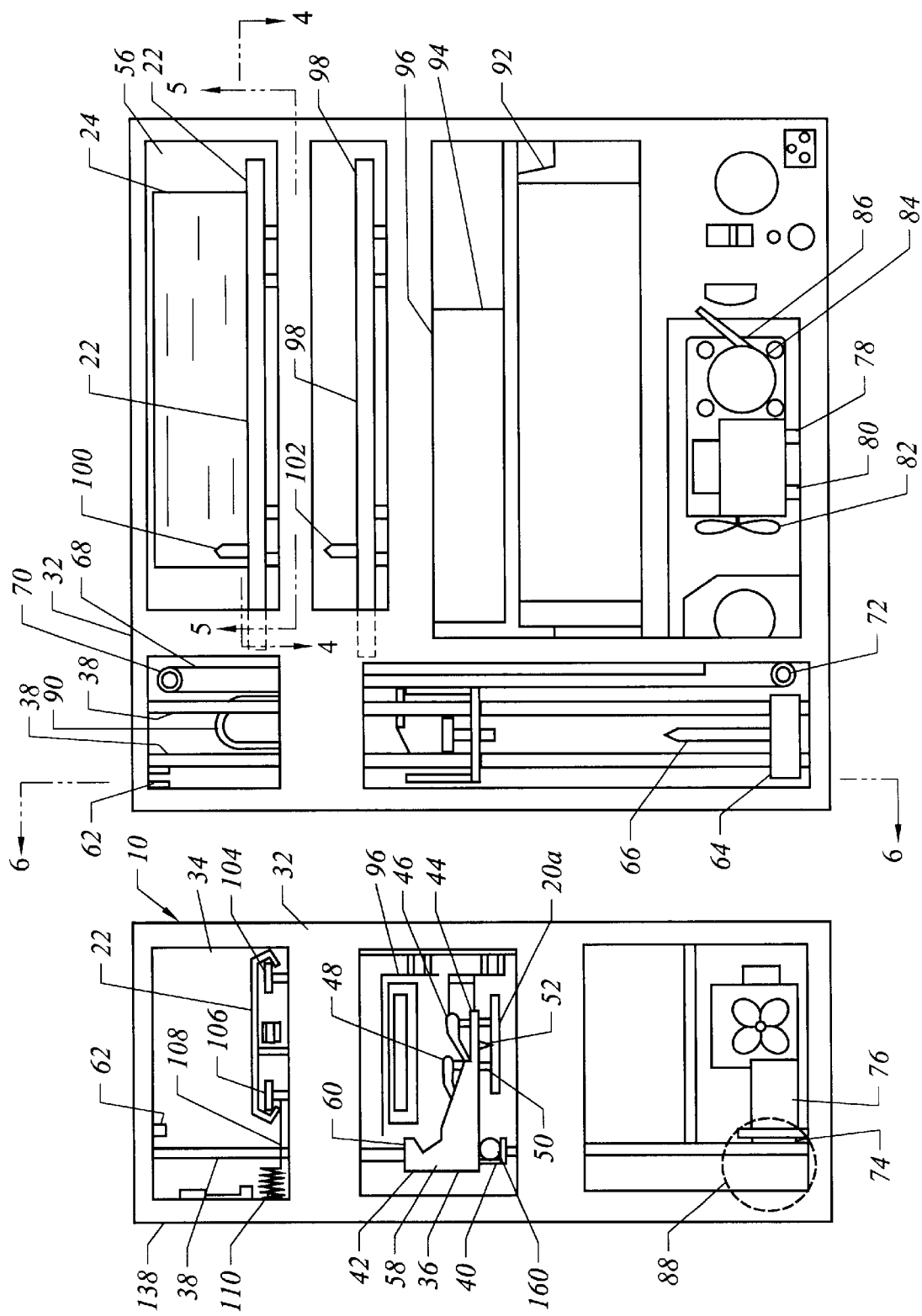

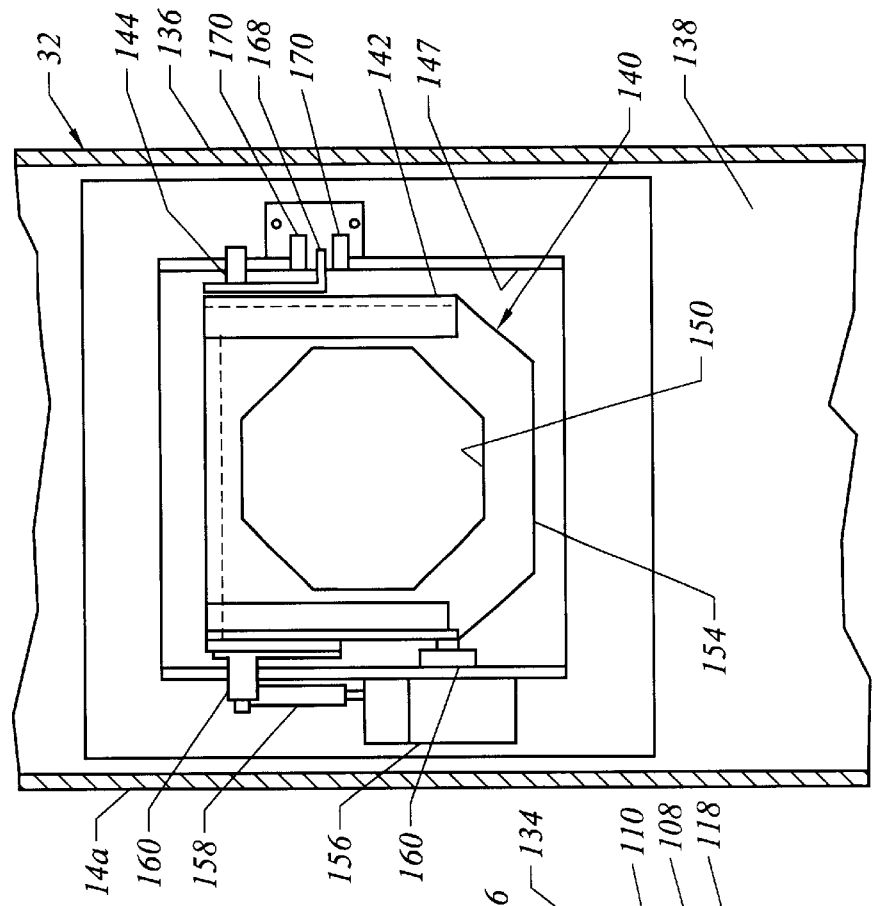
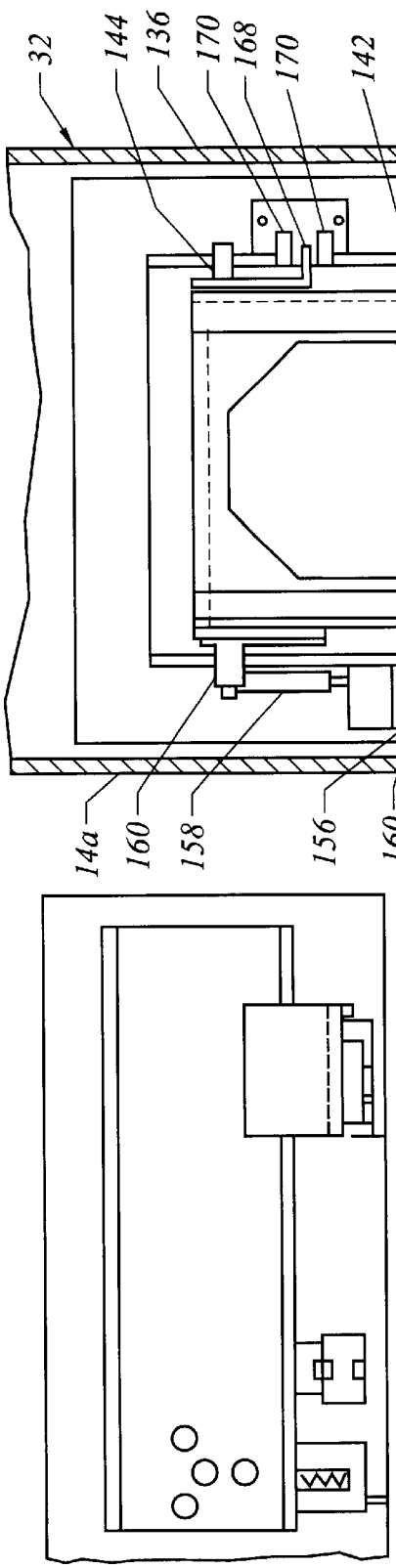
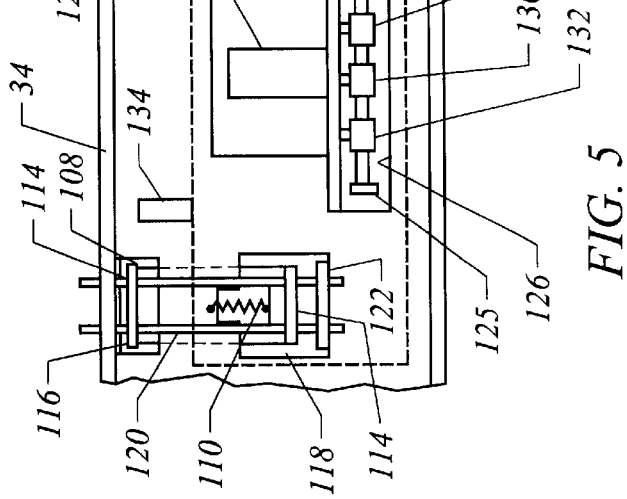
FIG. 4
FIG. 5
FIG. 6

DISK PROCESS AND TRANSPORT MECHANISM FOR HOST MACHINES

BACKGROUND OF THE INVENTION

This invention relates to a mechanism for processing and transporting compact disks in a disk recording and dispensing system. The disk process and transport mechanism here comprises a disk copying and dispensing apparatus for a host system such as a compact disk vending machine.

Marketing of digital information has gone through many transformations, blending techniques common to the entertainment industry and the business software industry. Application software was frequently carried on a series of floppy disks and sold in boxes containing the disks and reference materials, such as user manuals. Some entertainment software, such as computer gameware, was similarly packaged, often with minimal written material on pamphlets. The bulky packaging of computer boxware is wasteful of resources, including the space required to transport and display such wares.

Similarly, music recordings were traditionally sold in albums having a sleeve or casing sized to the vinyl recording disk. When digitized recordings on compact disks were first marketed, the smaller compact disks were marketed in plastic jewel cases with elongated cardboard display backing, in part to utilize display racks and shelves designed for the larger vinyl albums. Only after consumer protest over the wasteful packaging techniques, were compact disks commonly marketed in cases without the wasteful cardboard extensions.

With the development of inexpensive laser recording devices for writing data to compact disks, it became possible to record digital data or digitized information onto a compact disk that became a permanent record. While subsequent developments permit compact disks to be rewritten, the write once read many times process for digitized compact disks is preferred by many content providers as an unalterable medium for sale to ultimate consumers.

The obvious advantage of recording compact disks at the place of purchase is the elimination of an inventory, since the content data or information can be stored in a memory or master disk and used as needed to generate a recorded copy on demand.

When copies are made on blank compact disks, only an inventory of disk blanks need be maintained for a variety of different content items. While this has the disadvantage of using an unidentifiable copy, this deficiency can be cured by inclusion of a label printer in the apparatus for printing content identifying labels on the printed disks. The label printer can be of any conventional type used for generating disk labels, such as ink jet printers or thermal transfer printers. Decorative graphic material can be included in the labels which are printed directly on a prepared surface of the disk.

It is an object of this invention to provide a versatile compact disk copying and dispensing apparatus that can be incorporated into a variety of different disk production devices. In particular, the apparatus of this invention is adapted to be utilized in a compact disk vending machine for dispensing disks to consumers upon selection and payment.

In a preferred embodiment, the disk copying and dispensing apparatus includes a printer wherein the copying feature includes copying digital data to the disk, and copying digitally stored label data on the disk as printed label.

In addition, the dispensing feature includes alternate mechanisms for issuance of the copied disk after purchase, including an activated ramp guide to a pickup bin and an extendible tray. The extendible tray is designed for customer removal of the conveyed disk or for automatic removal by a mechanical means, for example, for transport to another processing station. Such a station may comprise a packing station where the copied and printed disk is placed into a sleeve, cartridge, jewel case, envelope or other packing device before delivery to the customer.

SUMMARY OF THE INVENTION

This apparatus of this invention relates to compact disk process and transport mechanisms and in particular to a disk copying and dispensing apparatus adapted to be incorporated into a vending machine.

The vending machine in the described embodiment is designed to dispense music recordings on data carriers of different types including CD disks, cartridges, including disk and tape cartridges, and cards, such as flash cards, PCMCIA cards or MP3 cards. The apparatus of this invention is a device having a controller responsive to commands from the host machine. Here the disk copy process is initiated by a user in the selection and payment of an item which activates the copying and automatic dispensing of items including the recorded compact disks handled by the mechanism of the subject copying and dispensing apparatus.

The copying and dispensing apparatus herein described, can be incorporated into different types of dispensing systems for different types of products on disk carriers, such as business and entertainment software, videos, audios and other digitized material.

To properly identify the products dispensed, the apparatus includes a label printer. Additionally, the apparatus includes disk parking stations to enhance the versatility of the invented slave machine to the commands of different host machines.

For example, the label printer may optionally print on unprinted or preprinted labels, selecting disks from one disk storage station or another. Alternately, a dispensable software application program may require a plurality of disks and it is preferred that the group of disks be recorded and printed as a batch before the dispensing sequence is initiated to dispense a series of disks in a batch or within a brief period. Additionally, different complexities in the printing operation and recording operation may result in mismatches in the timing of print cycles and recording cycles allowing disks finished one task to be stored before being transported to the following task.

Furthermore, since the disk copying and dispensing apparatus may be adapted to different disk recording systems, the apparatus utilizes a dispensing tray that also serves as a storage station. Alternately, an automatically positionable guide chute for processed disks directs a processed disk to a customer pickup bin in the vending machine or to a collection container for batch pick-up or transport to another processing station.

Additionally, because a preferred use of the apparatus is in a vending machine for a retail establishment, it is an object of this invention that the copying and dispensing apparatus be compact and modular in form. The apparatus includes a unitary housing frame having a small foot-print for installation into the host system.

BRIEF DESCRIPTION OF THE DRAWINGS

FIG. 2 is an end elevational view of a disk processing module that forms the copying and dispensing apparatus in the kiosk of FIG. 1.

FIG. 3 is a side elevational view of the disk processing module of FIG. 1.

FIG. 4 is a partial cross sectional view of the module of FIG. 2 taken on the lines 4—4 in FIG. 3, showing the disk parking tray 22.

FIG. 5 is a partial cross sectional view of the module of FIG. 2 taken on the lines 5—5 in FIG. 3.

FIG. 6 is an enlarged, partial cross sectional view taken on the lines 6—6 in FIG. 3.

DETAILED DESCRIPTION OF THE PREFERRED EMBODIMENTS

Figure 1:
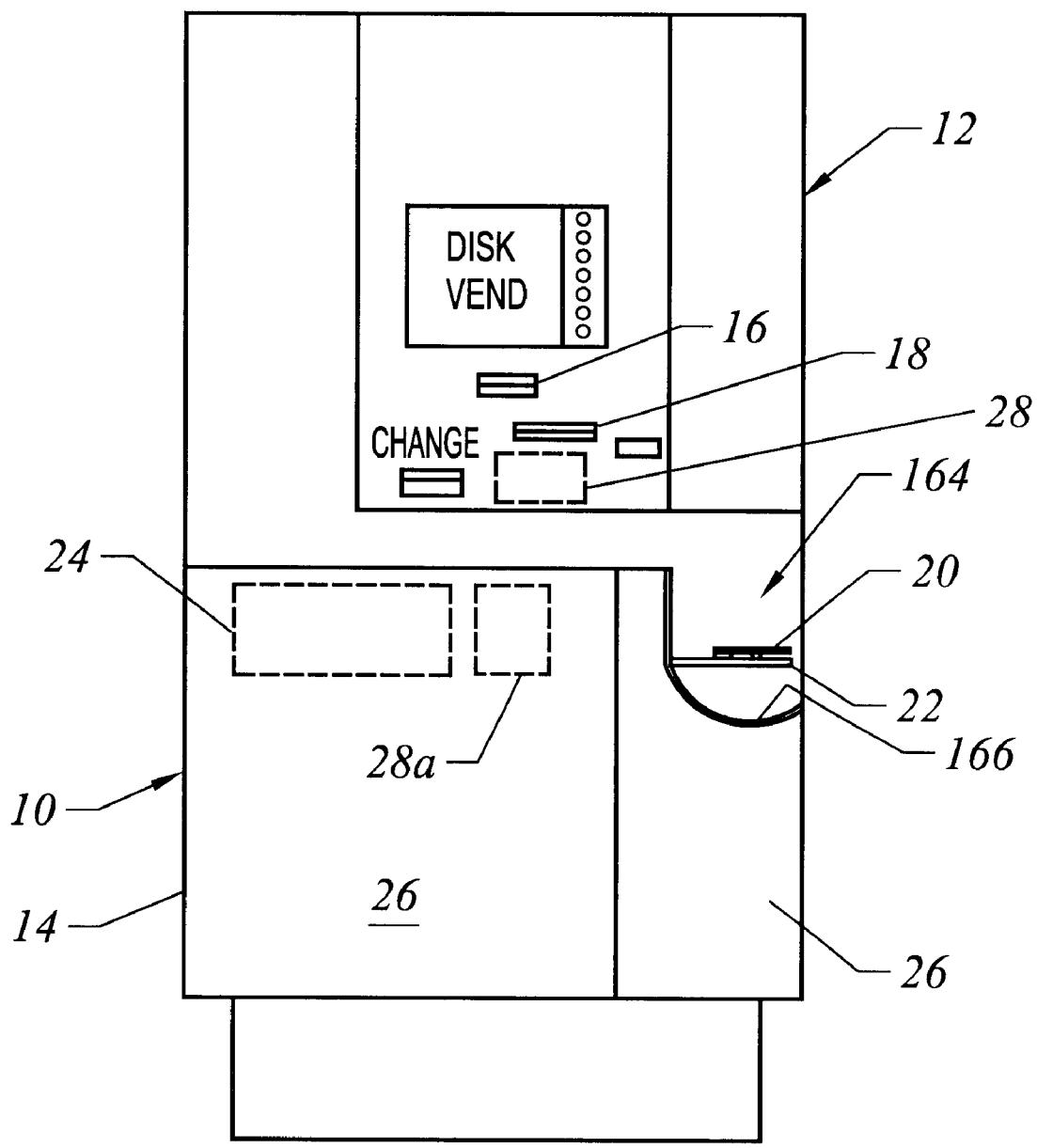
FIG. 1 is an end view of a music vending kiosk that includes the copying and dispensing apparatus of this invention.

The disk copying and dispensing apparatus of this invention is designated generally by the reference numeral 10 and is shown in FIG. 1 incorporated into a music kiosk 12 that vends music on customer selected media including a digitized compact disk or CD. The disk copying and dispensing apparatus is a command driven disk processing module 14 that can be installed into or combined with a variety of different host machines.

In the preferred embodiment both disk content and disk labeling is performed in the disk processing module 14. A blank disk from a disk inventory is recorded with digitized content from a host memory or master disk, and the disk is contemporaneously labeled with text and/or graphic material.

The music kiosk 12 in FIG. 1 is a vending machine with a currency receptacle 16 and a credit card receptacle 18 for receiving payment for a dispensed product, such as the compact disk 20 seated on an automated tray 22 that is extendible from the module shown in FIG. 1.

The disk processing module 10 includes a controller 24 shown schematically in dotted line in FIG. 1, which is mounted in the module 14, that in turn is installed within an outer casing 26 of the kiosk 12. The controller is instructed by a microprocessor 28 that customarily resides in the host machine as shown schematically in FIG. 1. Alternately the processor 28a resides in the processing module 14, when the processing module is functioning as a primary electromechanical device without a host machine. The microprocessor 28 is in most instances a general-purpose, programmable computer that is either pre-programmed with the operating routine or programmable using an input device such as a personal computer with a keyboard and monitor.

Referring to FIGS. 2 and 3, one embodiment of the disk processing module 10 is shown. In this embodiment the disk tray 22 is extendible, as illustrated in FIG. 1, and serves as the dispensing means for the module 10. The module can be modified to include a dispensing chute mechanism 30 as shown in the partial view of the modified disk processing module boa, shown in FIG. 6.

In FIG. 2, the processing module 10 has a frame 32 that forms a housing for the components. The frame 32 is formed of sheet metal as a box with a top, bottom and sides. The frame or housing has cutouts 34 allowing access to the mechanical and electrical components mounted in the frame. A vertically displaceable carriage 36 engages a track in the form of tracks on a pair of parallel guide rods 38 that engage carriage bearings (not shown). The carriage 36 is formed with a channel-shaped shell 42 having a lower lip 40, that functions as a cam surface in an alternate embodiment, and cantilevered end portion 44 with a vacuum-controlled, disk pick-up head 46. The disk pick-up head 46 includes vacuum hoses 48 that supply three flexible disk contact nipples 50 on the underside of the carriage 36.

The uniformly spaced contact nipples 50 are shown engaging a compact disk 20a in FIG. 2. An articulated finger switch 52 senses that a disk is engaged by the carriage and electronically signals the controller 24 mounted to a back wall 56 of the frame 32. The controller 24 executes commands from the processor 28, and other input devices that may by-pass or be used in conjunction with the processor. Essentially, the controller 24 coordinates the analog and digital operations of the disk copying and dispensing mechanism with the digital operations, such as routing digital copy data and code from the source archive to the disk recorders and printer for executing the disk recording and printing tasks. As noted the source archive may be contained on disks, in memory associated with the processor, or even at a dial-up location distant from the vending device.

The carriage 36 has sides 58 configured with a projecting tab 60 that co-acts with a photodiode sensor 62 to limit travel of the carriage. The carriage 36 moves between a disk inventory station 64, here a stack of disks 20b on an elongated spindle 66 (omitted from FIG. 1), and one or more task stations, where content and graphics are copied to the processed disks. Ultimately, the carriage moves to a discharge station where the copied disk is dispensed.

The cantilevered end portion 44 of the carriage 36 has a hole located centrally with respect to the nipples 50 of the pick-up head 46 allowing the carriage to position the pick-up head 46 at the top disk without interference from the projecting spindle 66.

The carriage 36 is connected to an endless belt 68 that loops around a top and bottom guiding idler rollers 70 and 72 and the drive capstan 74 of a stepping motor 76 controlled by the controller 24. The controller 24 executes commands and positions the carriage according to the task in the protocol of operations.

Mounted adjacent to the drive motor 76 is a vacuum unit 78 including a drive motor 88 with a cooling fan 82 and a coupled vacuum pump 84. The vacuum output is connected by a conduit 86 to a cylindrical vacuum tank 88 which maintains an adequate vacuum reservoir to generate a continuous suction at the engagement nipples 50 when a disk pick-up and transport sequence is initiated. A flexible vacuum conduit 90 loops over the carriage 36 allowing the carriage to displace without crimping the conduit.

In the arrangement of FIGS. 2 and 3, a disk printer unit 92 and a pair of disk recorders 94 and 96 are mounted in the frame 32 and positioned so that the loading tray 97 (one visible) of each device (not shown) will extend into the path of the pick-up head of the carriage for receiving a disk from or dispensing a disk to the pick-up head 46. A pair of sensors 99 for each tray are positioned to detect when a tray is extended.

In the embodiment of FIGS. 1 and 2 at least one if not both recorders 94 and 96 read compact disks as well as write to the disks, as is common for such commercially available disk recorder devices. This permits a disk in one recorder to be read for writing to a disk in the other recorder, if necessary. The preferred read/write disk drives are conventional components obtainable from a variety of different manufactures. The disk printer unit 92 is a conventional disk printer with an extendible tray or a specialty thermal transfer printer of the type designed for printing compact disks. The arrangement of sensors (not shown) for detecting extension of the print tray is the same as that of the disk recorders.

Above the recorders 94 and 96 are two extendible disk parking trays 22 and 98. As noted in the embodiment of FIGS. 1–3, the upper tray 22 also serves as a dispensing tray to deliver a disk 20 that has completed the recording and printing process to a customer, as shown in FIG. 1. Except for the procedure for super extending the upper tray 22 on disk dispensing, the trays 22 and 98 extend into the path of the pick-up head of the carriage in alignment with the center of the pick-up head 46. Each tray is shown with a short spindle 100 and 102 for holding a plurality of disks, for example, ten disks per spindle.

The incorporation of two trays greatly increases the versatility of the system. For example, where master disks must be stored in the disk processing module, the two parking stations permit the carriage pick-up head 46 to sort through a master stack, parking disks from one tray to the other, until the desired disk is obtained and transported to one of the disk recorders 94 or 96 for reading. Alternately, a series of disks in a recording session can be stored for dispensing as a batch. Or, a series of specialty silkscreened disks can be stored on a tray for selective use and over-printing by the printer. Since the system is primarily designed as a slave mechanism, the use can be customized to the operational design of the host system.

The disk trays 22 and 98 are constructed and operate in a similar manner, except when the upper tray also functions as a dispensing device. As shown in FIG. 2, the displaceable tray 22 tracks on opposed roller units 104 and 106. The pairs of roller units 106 include sliding carrier plates 108 that are connected to a tension spring 110, as shown in the partial underside view of the disk tray support plate 112 in FIG. 5. The two sliding carrier plates 108 for each tray have fold down ends 114 which project through rectangular openings 116 and 118 in the disk tray support plate 112. The fold down ends 114 engage parallel rods 120 which are seated at their ends in the frame 34 and edge fold 122 in opening 118. The tension spring 110 is anchored at one end to the support plate 112 and at the other end to the carrier plates 108. In this manner the roller units 106 with the sliding carrier plates are biased away from the stationary roller units 104 which are simply mounted to the support plate 112. Any transverse "play" in the displacement of the disk trays 22 and 98 is effectively eliminated.

The disk trays 22 and 98 are both displaced in the same manner. For example, disk tray 22 in FIG. 5 has a linear drive strap 124 anchored at each end 125 to the tray 22 and aligned with the direction of displacement as shown in the opening 126. A reversible drive motor 128 having an offset drive capstan 130 engages the drive strap 124. Two idler rollers 132 adjacent the capstan 130 maintain the engagement of the capstan 130 with the strap, which routes under the idler rollers 132 and over the capstan 130 in the underside view of FIG. 5.

As the trays are tracked on the roller units 104 and 106, optical sensors 134 detect the tray position, using a fold down tab 133 of a plate 135 fastened to the top of the trays as a flag, and locate the tray at the retracted, extended or super extended position (in the case where the tray comprises the dispenser). The sensors 134 feed to the controller and interrupt a displacement sequence at the appropriate positioning for storing disks or co-acting with the pick-up head 46.

In the alternate embodiment of the disk copying and dispensing apparatus 10a, a disk processing module 14a eliminates the use of the upper disk tray 22 as a dispensing device. In this embodiment, in which only a fragment of the disk processing module 14a is shown in FIG. 6, the apparatus is similar to that shown in FIGS. 2–5 with the upper tray 22 restricted in displacement to extension into the vertical path of the pick-up head of the carriage 36. In FIG. 6 the upper portion 136 of the end side 138 of the frame 32 is viewed from inside the module 14a. The frame 32 has an 140 opening (not visible) in which is mounted an automatic chute mechanism 140 with a chute 142 pivotally mounted on a pair of spaced pivot pins 144 that are mounted to the folded edge 146 of an opening 147 of the mounting plate 145 of the chute unit. The chute 142 has a flat delivery platform 148 with an octagonal opening 150 and two parallel slide strips 152 of plastic or other material that prevent damage to the surface of a disk dropped on the chute 142. When deposited on the chute by release of the vacuum, the disk slides on the strips 152 during dispensing to a bin, as shown in FIG. 1 or other receptacle.

To coordinate the positioning of the chute unit 140 with the carriage 36, the movement of the carriage activates the pivot of the chute 142. The bottom 154 of the chute 144 is thereby lifted inwardly and upwardly to a discharge position well above the pivot pins 144. To initiate engagement of the chute 142 with the carriage 36, a cam actuator 156 has a rotatable, eccentrically-mounted cam roller 158 on a motor shaft 155 of motor that contacts a cam surface on a extension tab 160 on the chute unit 140. A cam roller 162 on the chute 142 engages a projecting cam track 40 on the displacing carriage 136 of FIG. 2, with roller 162 shown in dotted line. As a result the chute is pivoted to a sloping discharge position by the rising carriage 36. At the appropriate position in the cycle a suction retained disk is released by the pick-up head 46 to the chute 142, where it slides to a discharge bin, such as the bin 164 shown in FIG. 1. To prevent damage to the disk, the curvature of the bin slide 166 is such that the disk is supported by its edge without the recorded surface of the disk touching the bin slide 166.

A flag 168 on the side of the dispensing chute 142 of the disk processing module 14a coacts with pairs of elements 170 of two optical sensors 172 (not shown) to signal the initial displacement and subsequent engagement of the chute 142 by the carriage in a dispensing cycle. A coil spring 174 biases the chute 142 to its vertical disengagement position. The disk processing module 10, as shown in FIG. 3 has a power supply connector 176 and power supply switch 178 in a power supply unit 180 that includes the necessary transformers and power circuits to operate the system.

During operation, a sequence of tasks, programmed by the requirements of the host machine, are executed under command of the controller 24. With a redundancy in the number of disk recorders, the operation can be tailored or customized. This versatility in operation is enhanced by the incorporation of two disk parking trays 22 and 98. Although current requirements of compact size necessitated use of a single printer, multiple printers of the same or different type can advantageously be installed, for example, a thermal transfer printer and an ink jet printer.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A disk copying and dispensing apparatus for digital compact disks comprising:
   (a) a programmed operating processor;
   (b) a disk processing module including:
      (i) a frame having a top, bottom and sides forming a housing;
      (ii) a stacking device for storing a stack of unrecorded disks at the bottom of the frame;
      (iii) a linear guide track vertically extending between the top and bottom of the frame;
      (iv) a carriage in engagement with the guide track and vertically displaceable on the track;
      (v) a drive mechanism connected to the carriage and frame for displacing the carriage relative to the frame;
      (vi) a controller electronically connected to the operating processor and the drive mechanism for displacing the carriage according to a programmed sequence in the processor;
      (vii) a disk pick-up head on the carriage, the disk pick-up head having a disk engagement device, the disk pick-up head being transported on a linear path with the carriage and being positionable with the disk engagement device centered over a disk at the top of the stack of unrecorded disks;
      (viii) a disk recorder having an extendible disk tray for receiving and dispensing a disk for content recording, wherein the disk tray extends into the path of the disk pick-up head with the engagement device being centered over an extended disk tray during pick-up or deposit of a disk on the disk tray;
      (ix) a disk label printer having an extendible disk tray for receiving and dispensing a disk for disk label printing, wherein the disk tray of the disk label printer extends into the path of the disk pick-up head with the engagement device being centered over an extended tray during pick-up or deposit of a disk on the disk tray;
      (x) a disk parking tray having a drive mechanism wherein the disk parking tray has a disk holding device for holding at least one disk, wherein the disk parking tray is extendible into the path of the disk pick-up head with the engagement device being centered over the disk holding device during pick-up or deposit of a disk on the disk holding device of the disk parking tray, and wherein the disk parking tray has an extended position into the path of the disk pick-up head and a super extended position wherein the disk holding device projects from the frame for dispensing a copied disk;
   wherein the controller is electronically connected to the disk recorder, disk printer and disk parking tray for executing disk labeling and recording operations according to the programmed sequence of the processor.

2. The disk copying and dispensing apparatus of claim 1 wherein the linear guide track comprises a pair of parallel vertical rods and the carriage engages the rods and is vertically displaceable thereon.

3. The disk copying and dispensing apparatus of claim 1 wherein the disk stacking device comprises a spindle.

4. The disk copying and dispensing apparatus of claim 1 wherein the drive mechanism connected to the carriage comprises an endless belt and drive motor having a drive capstan engaging the belt.

5. The disk copying and dispensing apparatus of claim 1 wherein the programmed operating processor is part of a host device.

6. The disk copying and dispensing apparatus of claim 6 wherein the host device is a disk vending machine.

7. The disk copying and dispensing apparatus of claim 1 wherein the disk engagement device comprises a vacuum device with a vacuum contact that releasably engages a disk during displacement of the carriage.

8. A disk copying and dispensing apparatus for digital compact disks comprising:
   (a) a programmed operating processor;
   (b) a disk processing module including:
      (i) a frame having a top, bottom and sides forming a housing;
      (ii) a stacking device for storing a stack of unrecorded disks at the bottom of the frame;
      (iii) a linear guide track vertically extending between the top and bottom of the frame;
      (iv) a carriage in engagement with the guide track and vertically displaceable on the track;
      (v) a drive mechanism connected to the carriage and frame for displacing the carriage relative to the frame;
      (vi) a controller electronically connected to the operating processor and the drive mechanism for displacing the carriage according to a programmed sequence in the processor;
      (vii) a disk pick-up head on the carriage, the disk pick-up head having a disk engagement device, the disk pick-up head being transported on a linear path with the carriage and being positionable with the disk engagement device centered over a disk at the top of the stack of unrecorded disks;
      (viii) a disk recorder having an extendible disk tray for receiving and dispensing a disk for content recording, wherein the disk tray extends into the path of the disk pick-up head with the engagement device being centered over an extended disk tray during pick-up or deposit of a disk on the disk tray;
      (ix) a disk label printer having an extendible disk tray for receiving and dispensing a disk for disk label printing, wherein the disk tray of the disk label printer extends into the path of the disk pick-up head with the engagement device being centered over an extended tray during pick-up or deposit of a disk on the disk tray;
      (x) a disk dispensing chute, the chute having an actuating mechanism wherein the disk dispensing chute is displaced from a first position that avoids the path of the carriage and pick-up head and a second position that locates the chute under the disk engagement device of the pick-up head when dispensing a disk by the chute.

9. The disk copying and dispensing apparatus of claim 8 wherein the disk dispensing chute is connected to a pivot, wherein in the first position the chute is vertical and in the second position the chute is sloped to slidably discharge a disk deposited on the chute from the pick-up head.

10. The disk copying and dispensing apparatus of claim 9 wherein in the activating mechanism includes a displacement device and the chute includes an engagement mechanism that engages the carriage on displacement of the chute by the activating mechanism.

11. The disk copying and dispensing apparatus of claim 10 wherein the carriage includes a cam track and the engagement mechanism on the chute includes a cam roller.

12. The disk copying and dispensing apparatus of claim 8 including a disk parking tray having a drive mechanism wherein the disk parking tray has a disk holding device for holding at least one disk, wherein the disk parking tray is extendible into the path of the disk pick-up head with the engagement device being centered over the disk holding device during pick-up or deposit of a disk on the disk holding device of the disk parking tray;

wherein the controller is electronically connected to the disk recorder, disk printer and disk parking tray for executing disk labeling and recording operations according to the programmed sequence of the processor.

13. The disk copying and dispensing apparatus of claim 12 including an additional disk parking tray.

14. The disk copying and dispensing apparatus of claim 13 including an additional disk recorder.

15. A disk copying and dispensing apparatus of claim 13 wherein at least one disk recorder reads disks as well as records disks.

16. A disk copying and dispensing apparatus for digital compact disks comprising:

(a) a programmed operating processor;

(b) a disk processing module including:
  (i) a frame having a top, bottom and sides forming a housing;
  (ii) a stacking device for storing a stack of unrecorded disks at the bottom of the frame;
  (iii) a linear guide track vertically extending between the top and bottom of the frame;
  (iv) a carriage in engagement with the guide track and vertically displaceable on the track;
  (v) a drive mechanism connected to the carriage and frame for displacing the carriage relative to the frame;
  (vi) a controller electronically connected to the operating processor and the drive mechanism for displacing the carriage according to a programmed sequence in the processor;
  (vii) a disk pick-up head on the carriage, the disk pick-up head having a disk engagement device, the disk pick-up head being transported on a linear path with the carriage and being positionable with the disk engagement device centered over a disk at the top of the stack of unrecorded disks;
  (viii) a disk recorder having an extendible disk tray for receiving and dispensing a disk for content recording, wherein the disk tray extends into the path of the disk pick-up head with the engagement device being centered over an extended disk tray during pick-up or deposit of a disk on the disk tray;
  (ix) a disk label printer having an extendible disk tray for receiving and dispensing a disk for disk label printing, wherein the disk tray of the disk label printer extends into the path of the disk pick-up head with the engagement device being centered over an extended tray during pick-up or deposit of a disk on the disk tray;
  (x) a disk parking tray having a drive mechanism wherein the disk parking tray has a disk holding device for holding at least one disk, wherein the disk parking tray is extendible into the path of the disk pick-up head with the engagement device being centered over the disk holding device during pick-up or deposit of a disk on the disk holding device of the disk parking tray, and wherein the disk parking tray includes an assembly of roller units wherein select roller units have a self-adjusting mechanism for elimination of play in the displacement of the disk parking tray;

wherein the controller is electronically connected to the disk recorder, disk printer and disk parking tray for executing disk labeling and recording operations according to the programmed sequence of the processor.

17. The disk copying and dispensing apparatus of claim 16 wherein the disk parking tray has an extended position into the path of the disk pick-up head and a super extended position wherein the disk holding device projects from the frame for dispensing a copied disk.

18. The disk copying and dispensing apparatus of claim 16 wherein the linear guide track comprises a pair of parallel vertical rods and the carriage engages the rods and is vertically displaceable thereon.

19. The disk copying and dispensing apparatus of claim 16 wherein the disk stacking device comprises a spindle.

20. The disk copying and dispensing apparatus of claim 16 wherein the drive mechanism connected to the carriage comprises an endless belt and drive motor having a drive capstan engaging the belt.

21. The disk copying and dispensing apparatus of claim 16 wherein the programmed operating processor is part of a host device.

22. The disk copying and dispensing apparatus of claim 21 wherein the host device is a disk vending machine.

23. The disk copying and dispensing apparatus of claim 16 wherein the disk engagement device comprises a vacuum device with a vacuum contact that releasably engages a disk during displacement of the carriage.

* * * * *